United States Patent [19]
Chaffee et al.

[11] Patent Number: 5,117,418
[45] Date of Patent: May 26, 1992

[54] FREQUENCY DOMAIN ADAPTIVE ECHO CANCELLER FOR FULL-DUPLEX DATA TRANSMISSION

[75] Inventors: Donald L. Chaffee, Park City; Mark P. Mallory, Salt Lake City, both of Utah; Graham H. Brand, El Cerrito, Calif.

[73] Assignee: Intelligent Modem Corporation, Midvale, Utah

[21] Appl. No.: 612,011

[22] Filed: Nov. 9, 1990

[51] Int. Cl.⁵ .................. H04M 9/08; H04L 5/14
[52] U.S. Cl. .................. 370/32.1; 379/411; 379/406
[58] Field of Search .......... 370/32, 32.1; 379/406, 379/410, 411, 408

[56] References Cited

U.S. PATENT DOCUMENTS

| | | | |
|---|---|---|---|
| 4,593,161 | 6/1986 | Desblache et al. | 379/411 |
| 4,813,073 | 3/1989 | Ling | 370/32.1 |
| 4,853,765 | 5/1989 | Bergmans et al. | 370/32.1 |
| 4,896,318 | 1/1990 | Kokubo et al. | 370/32.1 |
| 4,951,269 | 8/1990 | Amano et al. | 379/406 |
| 5,008,923 | 4/1991 | Kitamura et al. | 370/32.1 |

Primary Examiner—Douglas W. Olms
Assistant Examiner—Wellington Chin
Attorney, Agent, or Firm—Thorpe, North & Western

[57] ABSTRACT

A system and method for reducing echoes on a duplex communication channel having both transmitted and received signals carried thereon, particularly a telephone channel having digital data transmitted thereon by way of a modem. The transmitted signal is converted from a time domain signal to a frequency domain transmitted signal by a fast fourier transform process. The frequency domain transmitted signal is multiplied by a set of filter coefficients to generate estimated echo coefficients. The estimated echo coefficients are converted from the frequency domain to the time domain by an inverse fast fourier transform process and then subtracted from the received signal to generate a residual echo signal. The residual echo signal is converted to a frequency domain residual echo signal by a fast fourier transform process and then multiplied by the complex conjugate of the frequency domain transmitted signal to generate correlation frequency components. The correlation frequency components are then used to update the filter coefficients so as to minimize the residual echo and at least partially cancel the echo present on the communication channel.

20 Claims, 2 Drawing Sheets

FREQUENCY DOMAIN ADAPTIVE ECHO CANCELLER FOR FULL-DUPLEX DATA TRANSMISSION

BACKGROUND

1. The Field of the Invention

This invention relates to telecommunications systems. More particularly, the present invention relates to systems and methods for echo cancellation during high speed data communications over telephone lines.

2. The Prior Art

Modern telecommunication systems allow almost any two points in the world to be placed in voice or data communications with each other. While the telephone system which is in place is generally efficient for its intended purpose, it inherently includes several undesirable characteristics. One such undesirable characteristic is the echo present in full duplex telephone systems.

Echo in a telephone system is often unavoidable. In the case of a telephone call between two local points, the local connection from the phone to the local telephone exchange is made by a two wire loop. In the case of a telephone call between two distant points, the connection (e.g., microwave or satellite link) will be converted from the bidirectional two wire loop to two unidirectional channels equivalent to two pairs of wires.

The device which accomplishes the two to four wire conversion is generally referred to as a "hybrid." In theory, all of the signal from the incoming channel of the four wire circuit is coupled to outgoing channel of the four wire circuit. Unfortunately, in practice, a significant amount of the energy is not coupled from the incoming signal to the outgoing signal. The remaining energy is conveyed back to the originator where it is perceived as an echo.

In short distance communications, the echo often involves delays of less than 40 milliseconds and a human user will not perceive a discrete echo. Still, even echoes which are delayed less than 40 milliseconds can disrupt high speed data communications. If a satellite link is in the communication channel, the echo may be delayed for over a second causing serve disruption of data and voice communications. Even though the level of the echo is generally down 11 dB from the original signal level, it is disruptive if not corrected, especially when data is being transmitted via a modem.

Echoes present on telephone channels are generally classified as "near-end" echoes and "far-end" echoes. Near-end echoes are strong and are generally caused by imperfections found in the equipment located at the local telephone switching office. Since the source of the near-end echo is nearby, there is usually little time between the transmission of the original signal and the receipt of the echo back at the transmitting device. Far-end echoes are generally weaker than near-end echoes and are defined as those echoes caused by imperfections in the telephone channel between the distant telephone switching office and the distant user. Since the source of the far-end echo is distant, the time between the transmission of the original signal and the receipt of the echo back at the transmitting device often is one-half of a second or more.

One approach which has been used to cancel echoes involves the use of a device often referred to as a "vari-losser" or a "switched loss device." Such an approach dynamically changes its connection to the telephone channel depending upon whether the near-end talker is speaking or the far-end talker is speaking. When the far-end talker is speaking, the path used to transmit the near-end speech is opened so that echo is prevented. Conversely, when the near-end talker is speaking, the same path is closed and a similar arrangement on the far-end is opened.

While the use of a vari-losser device provides adequate echo cancellation when the telephone channel is carrying human speech, even though in actual practice it's drawbacks include clipping speech sounds and impairing speech interruptions, it severely hinders high speed data communications.

Another principal approach which has been used in the past to construct an echo canceller consists of a filter in the form of a tapped delay line. The coefficients at each tap of the delay line define the transfer characteristic of the filter. For the tapped delay line to work as an echo canceller, the transfer characteristic found at one of the taps must match that of the echo path between the modem transmitter and modem receiver.

The "delay line filter" is used by a modem to estimate the echo return from the waveform to be transmitted by processing that waveform through the filter. Then, as the waveform is transmitted, the estimated echo is subtracted from the received signal.

Importantly, there have been numerous attempts to improve the methods whereby the tap coefficients are made adaptive so that the correct tap values can be learned during "training periods" when the echo canceller determines the correct filter characteristics which match the echo so that it can be subtracted out of the received signal. Other similar methods allow the tap coefficients to track any slow changes in the echo path as they occur during a communication session. Techniques which use tapped delay line methods are limited by processing speed to approximately 60–70 taps and thus the accuracy with which they are able to match the echo is limited.

BRIEF SUMMARY AND OBJECTS OF THE INVENTION

In view of the above described state of the art, the present invention seeks to realize the following objects and advantages.

It is a primary object of the present invention to provide a telecommunications echo canceller which is particularly adapted for high speed data transmission and which offers improved performance.

It is another object of the present invention to provide a system and method for echo cancellation which operates faster than previously available echo cancellers.

It is also an object of the present invention to provide an adaptive echo canceller which operates in the frequency domain.

It is a further object of the present invention to provide an echo canceller which is well suited to handling both near-end and far-end echoes.

It is a still further object of the present invention to provide an echo cancellation system and method which is particularly adapted for use with multi-frequency modems.

It is another object of the present invention to provide an echo cancellation system and method which is well suited for carrying out full-duplex data transmission over telephone channels.

These and other objects and advantages of the invention will become more fully apparent from the description and claims which follow, or may be learned by the practice of the invention.

The present invention provides a system for reducing echoes on a full duplex communications channel having both transmitted and received signals carried thereon. In particular, the present invention is well adapted for use with, or as part of, a modem which is transferring digital data across a telephone channel.

Embodiments of the present invention include a means for converting a transmitted signal generated by a modem, or other signal generating device, to a frequency domain transmitted signal. The means for converting the transmitted signal includes, in some preferred embodiments, a fast fourier transform processor and a means for concatenating N (e.g., 512) transmit samples of the transmitted signal and N (e.g., 512) zero value samples.

Also included in embodiments of the present invention is a mean for multiplying the frequency domain transmitted signal by an initial set of filter coefficients to generate estimated echo coefficients.

The present invention also preferably includes a means for subtracting the estimated echo coefficients from the frequency domain representation of the received signal to generate a residual echo signal. The means for subtracting the estimated echo coefficients from the received signal can desirably comprise a means for multiplying the residual echo signal by the complex conjugate of the frequency domain transmitted signal to generate correlation frequency components and a means for receiving the correlation frequency components and for updating the initial set of filter coefficients to another set of filter coefficients in accordance with the correlation frequency components so as to minimize the residual echo and at least partially cancel the echo present on the communications channel.

The means for multiplying the residual echo signal by the complex conjugate can preferably include a means for delaying the frequency domain transmitted signal by a required amount, i.e., two frame periods which will compensate for echo delay, a means for calculating the complex conjugate of the frequency domain transmitted signal, and a means for multiplying the residual echo signal by the complex conjugate of the frequency domain transmitted signal to generate correlation frequency domain components.

The method of the present invention includes the steps of converting the transmitted signal containing intelligence (i.e., representing digital data or analog information) to a frequency domain transmitted signal, multiplying the frequency domain transmitted signal by a set of filter coefficients to generate estimated echo coefficients, subtracting the estimated echo coefficients from the received signal to generate a residual echo signal, multiplying the residual echo signal by the complex conjugate of the frequency domain transmitted signal to generate correlation frequency components, and updating the set of filter coefficients to another set of filter coefficients in accordance with the correlation frequency components so as to minimize the residual echo and at least partially cancel the echo present on the communications channel.

In practice, the step of converting the transmitted signal to a frequency domain signal preferably comprises the step of processing 512 transmit samples of the transmitted signal by a fast fourier transform function.

Furthermore, it is desirable that the step of subtracting the frequency domain echo coefficients from the received signal comprise the steps of converting the estimated echo coefficients from the frequency domain to the time domain to generate an estimated echo (preferably by an inverse fast fourier transform process), subtracting the estimated echo from the received signal to generate a residual echo, and converting the residual echo from the time domain to the frequency domain (preferably by a fast fourier transform process).

The step of multiplying the residual echo signal by the complex conjugate of the frequency domain transmitted signal to generate correlation frequency components preferably also includes the steps of delaying the frequency domain transmitted signal by the required amount (e.g., two frame periods), calculating the complex conjugate of the frequency domain transmitted signal, and multiplying the residual echo signal by the complex conjugate of the frequency domain transmitted signal to generate correlation frequency domain components. It is also preferred to include the step of multiplying the correlation frequency components by a known factor to control the rate of updating the filter coefficients which will determine the amount of echo cancellation.

The method of the present invention is iteratively carried out until the residual echo value reaches an acceptable value. The method of the present invention is particularly well suited to be used when the communications channel comprises a telephone channel and wherein the transmitted signal is handled by block processing (which is inherent when frequency domain approaches are used).

BRIEF DESCRIPTION OF THE DRAWINGS

In order that the manner in which the above-recited and other advantages and objects of the invention are obtained can be appreciated, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Reference will now be made to the drawings wherein like structures will be provided with like reference designations.

As explained earlier, an echo filter can be implemented using time domain techniques employing a tapped delay line. In contrast, the present invention achieves its advantages by implementing an echo canceller using frequency domain techniques. The availability of computationally efficient Fast Fourier Transform techniques using modern signal processors make possible filters which can include many more values than the approximately 60-70 values available when tapped delay lines are used as part of echo cancellers.

In order to provide the most efficient echo cancellation, particularly for data transmission over telephone channels, the present invention applies frequency domain techniques to both the filtering function and to the filter coefficient update function so that the optimum filter function is selected.

The echo cancellation systems and methods of the present invention can be used in many communications applications but can most advantageously be used in both single-carrier or multi-carrier modems. It is with multi-carrier modem designs, however, that the echo canceller of the present invention provides particular advantages.

Figure 1:
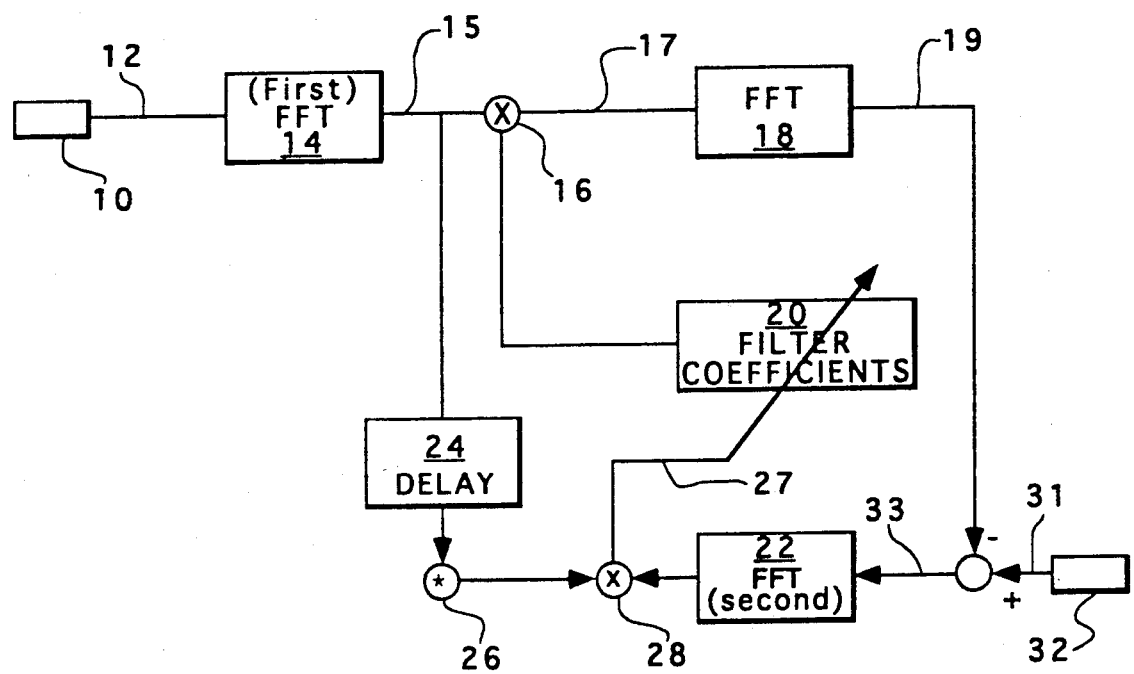
FIG. 1 is a generalized block diagram of the echo canceller of the present invention.

A generalized block diagram of the echo canceller system of the present invention is represented in FIG. 1. The echo canceller described herein is particularly suited to solving problems caused by near-end echo which is generally the strongest echo. Those skilled in the art will recognize, after gaining an understanding of the concepts taught herein, the structure and steps necessary to implement the present invention to solve problems caused by far-end echo.

Referring first to FIG. 1, a signal source 10 is represented in the general block diagram. The signal source can be a modem or other device which generates a transmitted signal 12 which is placed on a telephone channel 32. One multi-frequency modem which is well adapted for use with the present invention is described in the U.S. patent application of Mark P. Mallory for MODULATION METHOD AND APPARATUS FOR MULTICARRIER DATA TRANSMISSION filed on Oct. 19, 1990, which is now incorporated herein by reference.

The transmitted signal 12 which is to be dispatched over the telephone channel 32 is processed by a first Fast Fourier Transform (FFT) 14 as is known in the art. The first FFT 14 converts the time domain transmitted signal 12 into a frequency domain signal, referred to herein as a transformed transmitted signal, in accordance with the present invention.

It will be appreciated by those skilled in the pertinent art that all of the functions described herein can be carried out by a variety of hardware configurations. For example, a single microprocessor, with its required associated devices, can perform all of the functions and computations described herein. Alternatively, discrete devices can be arranged to perform the particular, or equivalent, functions which are described herein. Moreover, additional devices not mentioned herein may be available in the future to carry out the functions of the present invention, or functions equivalent to these functions, and are intended to fall within the scope of the present invention. Workers in the art will be able to determine which hardware configuration is best for a particular application using the teachings contained herein.

Initial filter coefficients, represented at block 20, which have been learned during a training period as will be explained shortly, are available for each frequency component present in the transformed signal. During the training period, the filter coefficients may begin all set to zero and a signal sent over the telephone channel. The filter coefficients are then adjusted step-wise until the filter characteristics approximately match the telephone channel echo characteristics.

The filter coefficients are multiplied by the corresponding transformed signal frequency components at 16 to generate estimated echo coefficients 17. The output of the filter is then determined by an inverse FFT (FFT$^{-1}$) 18 which transforms the estimated echo coefficients 17 into a time domain estimated echo signal. The time domain estimated echo signal 19 will be subtracted from the received signal during the transmission of the transmitted signal 12 onto the telephone channel 32.

If the filtering just described exactly models the actual echo path, then the estimated echo will equal the actual transmitter-to-receiver echo and the subtraction will completely eliminate the echo from the received signal. This is the goal of any echo canceller but, due to noise and other sources of inaccuracies, there will remain within the received signal a residual echo that is not removed. The present invention modifies the filter coefficients such that the level, or power, of the residual echo signal is minimized.

In order to adapt the filtering to match the actual echo, the filter coefficients must be updated. Still referring to FIG. 1, the estimated echo 19 is subtracted out of a received signal 31 at junction 30 resulting in a residual echo signal 33 being output. The updating of the filter coefficient utilizes a second Fast Fourier Transform (FFT) 22 to transform a residual echo signal 33 (obtained from the received signal 31) into the frequency domain.

The residual echo 33 that is buried within the received signal 31 is that part of the received signal 31 which is correlated with the transmitted signal 12. One part of the received signal 31 is the waveform transmitted from the other modem connected to the far end of the telephone channel 32 which is uncorrelated with the transmitted signal 12 due to modem design. Another part of the received signal 31 is telephone channel noise which is also uncorrelated with the transmitted signal 12. Thus, correlation techniques provide a method for determining the residual echo in the received signal as will now be explained.

While correlation methods have in the past been used in tapped delay line echo cancellers, the present invention deals in the frequency, rather than the time, domain and thus novel correlation techniques must be used. In the frequency domain, correlation between the transmitted waveform 12 and the received waveform 31 is determined by taking the complex conjugate at 26 of each frequency component of the transformed transmitted signal 15 (after it has been delayed at 24) and multiplying those components at 28 by the corresponding frequency component (output from the second FFT 22) of the received signal 31. The result which is output from the multiplication function represented at 28 is an array of correlation frequency components 27 embodying a measure of the residual echo. These correlation frequency components 27 are used to update the filter coefficients 20 such that the filter characteristic will move in the direction to minimize the residual echo 33. The apparatus of the present invention continues the iterative process of estimating the echo coefficients until the residual echo reaches an acceptably low value.

Figure 2:
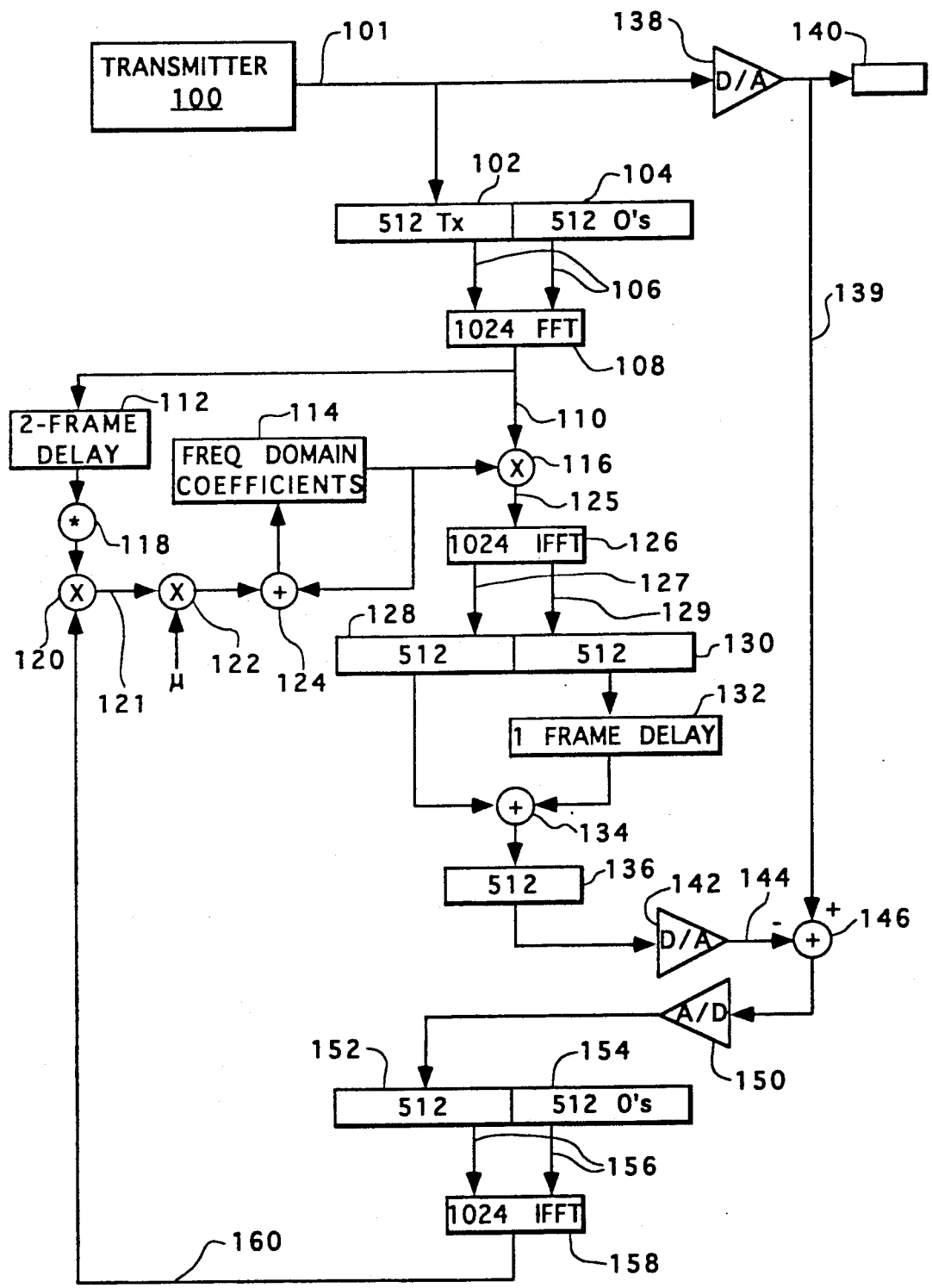
FIG. 2 is a detailed block diagram of the preferred embodiment of the echo canceller of the present invention adapted to function as a near end echo canceller.

Referring next to FIG. 2, a detailed block diagram of a specific embodiment of the present invention is provided. The block diagram of FIG. 2 sets forth the processing required to implement the present invention as a near-end echo canceller.

A transmitter 100, such as a modem as described earlier, outputs a transmitted signal 101. The transmitted signal 101 is sampled by taking N samples (512 in this example at 102) of the transmit signal 101. An additional N samples, all having a zero value, are provided at 104. The 512 transmitted signal samples are concatenated with the 512 zero value samples to create a 2N array of 1024 time samples 106 for transformation into the frequency domain by a 1024 FFT at 108.

While the use of 512 samples is prepared, other values of samples can readily be used in accordance with the present invention. The concatenation of the samples of the transmit signals with the zero value samples is a technique known as "over-add sectioning" which is used to avoid the effects of circular convolution. The result is 512 complex frequency samples 110 that represent, in the frequency domain, the signal which is to be placed on the telephone channel.

The frequency domain filter coefficients represented at 114 are multiplied at 116 by the corresponding transmit signal frequency components to create 2N (1024) correlation frequency components 125. A 2N (1024) Inverse Fast Fourier Transform (IFFT) 126 transforms these frequency components into a resulting time signal in the time domain.

The first half of the time signal 127 represents the estimate of the residual echo in the current N sample time. The second half of the time signal 129 represents the response of the filter formed by the system to the current N samples that will be carried over to the next N samples because of the filter's memory. Together, the first and second half of the time signals 127 and 130 represent the estimated echo. Thus, the second N samples, represented at 130, of the estimated echo are placed in memory (the 1 frame delay represented at 132 in FIG. 2) so they can be added to the result of processing of the next N samples.

The first N samples, represented at 128, are added (as indicated at 134) to the last N samples determined during processing of the previous N samples. The resulting output includes 512 values as represented at 136. The 512 values 136 are processed by a digital to analog convertor (D/A) 142 to produce an estimated echo signal 144.

The estimated echo signal 144 is subtracted (represented at 146) from the received signal on a sample-by-sample basis as the transmitted samples are output from digital to analog convertor (D/A) 138 and sent to the telephone channel 140. The resulting output from the subtraction operation 146 is a residual echo/received signal 148 containing (1) the residual echo, (2) the desired signal transmitted from the other modem, or other device, at the far end of the telephone channel, and (3) telephone channel noise.

The residual echo/received signal 148 is processed by an analog to digital convertor (A/D) 150 and transformed into the frequency domain by concatenating the 512 sampled values output from an analog to digital convertor (A/D) 150 with 512 zero-valued samples. The resulting 1024 time signals 156 are processed by an Inverse Fast Fourier Transform (1024 IFFT) 158 resulting in 512 complex frequency samples 160. It will be appreciated that the 512 complex frequency samples 160 are obtained in a manner identical to the processing of the transmit signal 101 as explained earlier.

The cross-correlation between the received signal (as represented by the 512 complex frequency samples) and the transmitted signal 101 is computed by taking the complex conjugate, as represented at 118, of the transmitted signal 101 and multiplying it by the associated frequency component of the 512 complex frequency samples 160 (representing the received signal) to create a correlation coefficient 121. Each resulting correlation coefficient 121 is multiplied by a factor $\mu$ (as represented at 122 in FIG. 2) which controls the rate of adaptation.

The value of $\mu$ can different for different frequencies. Also, during training periods, the value of $\mu$ can be relatively large and during operating periods, the value of $\mu$ can be smaller. New filter coefficients are computed by adding the result of $\mu$ multiplied by the correlation coefficient 121 to the old filter coefficient value (114).

The organization represented in FIG. 2 provides an efficient echo cancellation system for a modem which processes data in relatively large blocks. This block processing approach, which is inherent in the frequency domain approach, results in improved adaptive echo filter performance. The performance of the block processing approach is much better than the performance obtained when using sample-by-sample processing common in tapped delay line, time-domain processing.

Furthermore, the large block sizes preferred for use with the present invention provide significant computational advantages when used with multi-carrier modems. The large block sizes, however, can be a disadvantage to short symbol time, single-carrier modems because the large block sizes increase the modem's latency. Significantly, large block sizes are inherent in the design of multi-carrier modems and thus multi-carrier modems can particularly benefit from all the advantages of the frequency domain approach to echo cancellation of the present invention.

Using the frequency domain echo canceller of the present invention, several particular advantages accrue, including the following.

The filter coefficients of the echo canceller are in the frequency domain. As such, if certain portions of the frequency band are known to contain no transmit power, those coefficients can be set to zero in the system. This will prevent the system from trying to estimate filter coefficients where there is no transmitted energy. Attempts to estimate such coefficients would be completely controlled by noise and other received signals and would always be in error causing a degradation in cancellation performance. In echo cancellers where the filter coefficients are represented in the time domain, the relationship between coefficients and filter frequencies in the filter coefficients result in a phenomenon known as 37 tap growth".

Also, the block processing inherent in a frequency domain approach provides significant signal averaging which reduces the noise power present in the filter coefficient correction terms. This reduces the undesirable effect known in tapped delay line implementations as "tap jitter".

Furthermore, a fast "train" (i.e., the process whereby the correct filter coefficients are selected) can be performed because the frequency domain filter coefficients of the echo canceller can be estimated during a training period by measuring the frequency response of the echo path. The frequency response coefficients can then be used directly as the echo canceller filter coefficients. The use of frequency response coefficients directly as the echo canceller filter coefficients significantly reduces the time required to train an echo canceller/modem combination and begin to transmit data onto the telephone channel.

Moreover, in the present invention the size of the adaptation step can be adjusted independently for each frequency component. Since the transmitted power at each frequency is known (the FFT of the transmit signal), the step size can be made a function of the power actually transmitted in that frequency band. Thus, filter coefficient updating can be done as a function of signal-to-noise ratio in a very small frequency band associated with each filter coefficient. This advantage of the present invention allows for echo canceller adaptation optimization which is not otherwise available.

Those skilled in the art will appreciate that the echo canceller described herein is particularly adapted for canceling near-end echoes. The described echo canceller is also useful for canceling far-end echo. When an embodiment of the present invention is intended to cancel far-end echoes, particular considerations should be accounted for.

First, in the case of a far-end echo, the bulk delay is unknown and could be very lengthy, e.g., more than one second due to satellite paths in the telephone channel. The term "bulk delay" refers to the time required for the transmitted signal to leave the local transmitter, traverse the telephone channel to the far end, and then return to the local receiver as an echo.

Second, in the case of a far-end echo, due the presence of modulation systems in long distance telephone connections that are imperfect, a frequency offset often occurs in the echo so that, for example, if a 1000 Hz sine wave were transmitted a 1002 Hz sine wave might be received as an echo. With theses considerations in mind, in accordance with the teachings presented herein, the present invention is able to readily function as an echo canceller for far-end echoes.

In view of the foregoing, it will be appreciated that the present invention provides a echo canceller for use in connection with communication channels and which is particularly adapted for data transmission across telephone channels and which offers improved performance over other available echo cancellation systems and methods. The present invention also provides a system and method for echo cancellation which operates faster than previously available echo cancellers and which provides an adaptive echo canceller which operates in the frequency domain.

The present invention also provides an echo canceller which is well suited to handling both near-end and far-end echoes and which is particularly adapted for use with multi-frequency modems. Still further, the present invention provides an echo cancellation system and method which is well suited for use with carrying out full-duplex data transmission over telephone channels.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A system for reducing echoes on a duplex communication channel having both transmitted and received signals carried thereon, the system comprising:

means for converting a time domain transmitted signal containing intelligence to a frequency domain transmitted signal;

means for multiplying the frequency domain transmitted signal by an initial set of filter coefficients to generate estimated echo coefficients;

means for subtracting the estimated echo coefficients from a received signal to generate a residual echo signal;

means for multiplying the residual echo signal by the complex conjugate of the frequency domain transmitted signal to generate correlation frequency components, the correlation frequency components each having a magnitude and a sign; and means for receiving the correlation frequency components and for updating the initial set of filter coefficients to another set of filter coefficients, each of the filter coefficients being updated as required by the magnitude and sign of a corresponding correlation frequency component to minimize the residual echo and at least partially cancel the echo present on the communication channel.

2. A system for reducing echoes on a duplex communication channel as defined in claim 1 wherein the means for converting the transmitted signal to a frequency domain signal comprises a fast fourier transform processor.

3. A system for reducing echoes on a duplex communication channel as defined in claim 2 wherein the means for converting the transmitted signal to a frequency domain signal further comprises mean for concatenating N transmit samples of the transmitted signal and N zero value samples.

4. A system for reducing echoes on a duplex communication channel as defined in claim 1 wherein the means for subtracting the frequency domain estimated echo from the received signal comprises:

means for converting the estimated echo coefficients from the frequency domain to the time domain to generate an estimated echo;

means for subtracting the estimated echo from the received signal to generate a residual echo; and means for converting the residual echo from the time domain to the frequency domain.

5. A system for reducing echoes on a duplex communication channel as defined in claim 4 wherein the means for converting the estimated echo coefficients from the frequency domain to the time domain to generate an estimated echo comprises an inverse fast fourier transform processor and wherein the means for converting the residual echo from the time domain to the frequency domain comprises a fast fourier transform processor.

6. A system for reducing echoes on a duplex communication channel as defined in claim 1 wherein the means for multiplying the residual echo signal by the complex conjugate of the frequency domain transmitted signal to generate correlation frequency components comprises:

means for delaying the frequency domain transmitted signal;

means for calculating the complex conjugate of the frequency domain transmitted signal; and means for multiplying the residual echo signal by the complex conjugate of the frequency domain transmitted signal to generate correlation frequency domain components.

7. A system for reducing echoes on a duplex communication channel as defined in claim 6 wherein the means for multiplying the residual echo signal by the complex conjugate of the frequency domain transmitted signal to generate correlation frequency components further comprises means for multiplying the correlation frequency components by a factor to control the rate of updating the filter coefficients.

8. A system for reducing echoes on a duplex communication channel as defined in claim 1 wherein the communication channel comprises a telephone channel.

9. A system for reducing echoes on a duplex communication channel as defined in claim wherein the intelligence contained in the transmitted signal comprises vital data.

10. A system for reducing echoes on a duplex communication channel as defined in claim 1 further comprising a modem, the modem including means for generating the transmitted signal.

11. A method of reducing echoes on a duplex communication channel having both transmitted and received signals carried thereon, the method comprising the steps of:
(a) converting a time domain transmitted signal containing intelligence to a frequency domain transmitted signal;
(b) multiplying the frequency domain transmitted signal by an initial set of filter coefficients to generate estimated echo coefficients;
(c) subtracting the estimated echo coefficients from a received signal to generate a residual echo signal;
(d) multiplying the residual echo signal by the complex conjugate of the frequency domain transmitted signal to generate correlation frequency components, the correlation frequency components each having a magnitude and a sign; and
(e) receiving the correlation frequency components and for updating the initial set of filter coefficients to another set of filter coefficients, each of the filter coefficients being updated as required by the magnitude and sign of a corresponding correlation frequency component to minimize the residual echo and at least partially cancel the echo present on the communication channel.

12. A method of reducing echoes on a duplex communication channel as defined in claim 11 wherein the step of converting the transmitted signal to a frequency domain signal comprises the step of processing the transmitted signal by a fast fourier transform.

13. A method of reducing echoes on a duplex communication channel as defined in claim 12 wherein the step of converting the transmitted signal to a frequency domain signal further comprises obtaining 512 transmit samples of the transmitted signal.

14. A method of reducing echoes on a duplex communication channel as defined in claim 11 wherein the step of subtracting the frequency domain estimated echo from the received signal comprises the steps of:
converting the estimated echo coefficients from the frequency domain to the time domain to generate an estimated echo;
subtracting the estimated echo from the received signal to generate a residual echo; and
converting the residual echo from the time domain to the frequency domain.

15. A method of reducing echoes on a duplex communication channel as defined in claim 14 wherein the step of converting the estimated echo coefficients from the frequency domain to the time domain to generate an estimated echo comprises the step of processing the estimated echo coefficients by an inverse fast fourier transform and wherein the step of converting the residual echo from the time domain to the frequency domain comprises the step of processing the residual echo by a fast fourier transform.

16. A method of reducing echoes on a duplex communication channel as defined in claim 11 wherein the step of multiplying the residual echo signal by the complex conjugate of the frequency domain transmitted signal to generate correlation frequency components comprises the steps of:
delaying the frequency domain transmitted signal;
calculating the complex conjugate of the frequency domain transmitted signal; and
multiplying the residual echo signal by the complex conjugate of the frequency domain transmitted signal to generate residual frequency domain components.

17. A method of reducing echoes on a duplex communication channel as defined in claim 16 wherein the step of multiplying the residual echo signal by the complex conjugate of the frequency domain transmitted signal to generate correlation frequency components further comprises the step of multiplying the correlation frequency components by a factor to control the rate of updating the filter coefficients.

18. A method of reducing echoes on a duplex communication channel as defined in claim 11 further comprising the step of repeating steps (a) through (e) until the residual echo value reaches an acceptable value.

19. A method of reducing echoes on a duplex communication channel as defined in claim 11 wherein the communication channel comprises a telephone channel.

20. A method of reducing echoes on a duplex communication channel as defined in claim 11 wherein the intelligence contained in the transmitted signal comprises digital data and wherein the transmitted signal is generated by a modem.

* * * * *